United States Patent [19]

Kalocsai

[11] Patent Number: 5,468,261
[45] Date of Patent: Nov. 21, 1995

[54] REVERSIBLE TRANSFORMATION OF HYDROCARBONS

[75] Inventor: Guy I. Z. Kalocsai, Panoroma Park, Australia

[73] Assignee: Skylab International Limited, Valletta, Malta

[21] Appl. No.: 50,182

[22] PCT Filed: Oct. 4, 1993

[86] PCT No.: PCT/AU91/00499

§ 371 Date: Sep. 7, 1993

§ 102(e) Date: Sep. 7, 1993

[87] PCT Pub. No.: WO92/07917

PCT Pub. Date: May 14, 1992

[30] Foreign Application Priority Data

Nov. 2, 1990 [AU] Australia ................... PK3135

[51] Int. Cl.$^6$ ........................................ C10L 5/00
[52] U.S. Cl. ................. 44/268; 44/265; 210/291; 210/727; 210/924
[58] Field of Search ................... 210/691, 727, 210/424; 44/268, 265

[56] References Cited

U.S. PATENT DOCUMENTS

| | | | |
|---|---|---|---|
| 3,265,616 | 8/1966 | Wyllie et al. | 210/708 |
| 3,635,819 | 1/1972 | Kaiser | 210/40 |
| 3,755,189 | 8/1973 | Gilchrist et al. | 252/316 |
| 4,178,265 | 12/1979 | Matsuda et al. | 252/316 |
| 4,233,162 | 11/1980 | Carney | 252/8.5 |
| 4,420,573 | 12/1983 | Fogg et al. | 523/333 |
| 4,497,663 | 2/1985 | Fisher et al. | 134/4 |
| 4,780,518 | 10/1988 | Ceaser | 527/300 |
| 5,076,938 | 12/1991 | Noonan et al. | 210/708 |

FOREIGN PATENT DOCUMENTS 63-091137A 4/1988 Japan.

OTHER PUBLICATIONS

Billmeyer, F. W., *Textbook of Polymer Science*, pp. 378, 379, 498–501, 506, 507, 530–541, Interscience, N.Y. (1962).

*Primary Examiner*—Donald P. Walsh
*Assistant Examiner*—Anthony R. Chi
*Attorney, Agent, or Firm*—Larson and Taylor

[57] ABSTRACT

This invention relates to the use, transport, storage, recovery and re-use of chemical compounds. In particular, the invention is directed to a method for reversibly transforming organic compounds into a phase more suitable for subsequent handling but from which the original organic compounds can be readily recovered. The invention is particularly suited for, but not limited to, the recovery and re-use of liquid hydrocarbons, either naturally occurring or synthetic, and/or their derivatives, and it is expected to be especially useful in the recovery of hydrocarbons from an oil spill.

19 Claims, No Drawings

REVERSIBLE TRANSFORMATION OF HYDROCARBONS

TECHNICAL FIELD

THIS INVENTION relates to the use, transport, storage, recovery and re-use of chemical compounds. In particular, the invention is directed to a method for reversibly transforming organic compounds into a phase more suitable for subsequent handling but from which the original organic compounds can be readily recovered.

The invention is particularly suited for, but not limited to, the recovery and re-use of liquid hydrocarbons, either naturally occurring or synthetic, and/or their derivatives and in is expected to be especially useful in the recovery of hydrocarbons from an oil spill.

BACKGROUND ART

In recent times, the non-availability of an efficient method of reclaiming crude oil accidentally spilled from ocean tankers and the like has become very apparent. The "Exxon Valdez" disaster, in which 40 million liters of crude oil were released into the ocean, and the more recent "Mega Borg" disaster wherein in excess of 11 million liters were similarly spilled, illustrate the magnitude of the problem. In the case of the "Exxon Valdez", in addition to the financial loss from the lost production from the crude oil, the owners of the tanker spent more than $US2 billion in an attempt to clean up the spill and were also expected to be fined at least $US1.5 billion in penalties.

Current methods of attempting to clean up such spills include (1) the use of oil-skimming boats and containment booms; (2) bombarding the floating oil with chemical dispersants; and (3) bioremediation, whereby oil-consuming bacteria are dumped on the oil. However, none of these current methods are considered satisfactory as significant quantities of the oil spilled cannot seemingly be recovered or dispersed by any of these methods and pollution of the environment thus continues for many years afterwards.

Further, the more common chemical dispersion method is to use detergents which do not remove the offending spill but simply diminure the oil, making it seemingly less obvious and less insidious to the environment, which is not the true situation as damage to the environment still occurs. Also, the introduction of excessive quantities of detergents to a particular area is damaging in itself to the environment.

Another area where control of compounds, particularly liquid organic compounds, is required is the disposal and safe storage of toxic waste. At present, such toxic waste is usually contained in receptacles which are buried in the ground. However, receptacles are known to crack, rust or otherwise leak, thus allowing seepage of dangerous chemicals into the environment.

An oil-well fire is yet another example of where control of an organic compound, in this case burning hydrocarbons, is extremely difficult with some fires taking many months to extinguish. The main problem is the intense heat associated with such a fire causing ready re-ignition of the remaining oil and thus associated volatile components.

Prior art approaches to overcome such problems include applying refrigerants such as solid or liquid carbon dioxide and liquid nitrogen to oil spills on water for the purpose of either solidifying the oil or manipulating its movement.

Yet other prior art methods comprise applying solid materials to absorb spilled liquid hydrocarbons. Materials have included straw, newspaper, expanded perlite and a number of polymers of various compositions and configurations.

With regard to the prior use of polymers, it has been recognised that a number of hydrocarbon polymers affect the viscosity characteristics of the hydrocarbon liquid in which they are dissolved. Dependent upon polymer concentration, the viscosity of the liquid can be varied from reducing viscosity to increasing viscosity to a rubbery semi-solid or solid.

However, it is recognised that relatively high molecular weight polymers dissolve very slowly and prior art approaches include contacting the polymer with the hydrocarbon at ambient to relatively elevated temperatures. Because many of the rubbery polymeric materials are relatively soft and resilient, they are extremely difficult and often impossible to comminute.

Nevertheless, prior art advances in this technology include U.S. Pat. No 4,420,400, which describes a process for bodying a liquid hydrocarbon by dissolving sufficient polymer therein to substantially increase its effective viscosity and thereby converting the liquid to a semi-solid gel or to a rubbery solid. Successful practice of this process requires that the polymer be cryogenically comminuted and applied to the hydrocarbon in association with a cryogenic refrigerant. The comminution problem is overcome by cryogenically cooling a polymer slab which is then cut into smaller pieces. A preferred group of polymers are of a relatively high molecular weight, at least 1,000,000.

International Patent Application No PCT/US86/02638 describes the preparation of stable-non-agglomerating and rapid dissolving particulate polymer compositions by chilling the polymer to a temperature below its glass transition temperature using an inert cryogenic refrigerant and comminuting the chilled and brittle polymer to form particles thereof. The polymer particles are maintained at a temperature below the glass transition temperature of the polymer and are mixed with a finely divided, solid coating agent. The coating agent must be a solid, must be non-reactive toward the polymer and must have a median particle diameter less than one tenth the median diameter of the polymer particles. The coating agent particles and the polymer particles are physically admixed while warming the mixture to and above the glass transition temperature of the polymer resulting in the coating agent forming a multi-layered shell around each polymer particle.

However, these approaches to oil-spill control have significant disadvantages including complex reaction conditions, long dissolution times, low temperatures required, storage of components in pressure vessels prior to use and consequent increased transportation costs.

DISCLOSURE OF THE INVENTION

It is a general object of the present invention to overcome, or at least ameliorate, one or more of the above problems and to provide a method which is not only suitable for the use, transport, storage, recovery and re-use of hydrocarbons and other compounds, but can also provide a useful end product which can be further processed to products, or to pre-cursors of such products, of significant commercial value.

The present inventor has discovered that, if a hydrocarbon(s) is contacted with one or more particular reagents, an absorbent can be produced which absorbs substantially all of the hydrocarbon(s) to form a product whose elasticity can readily be controlled from elastic, through viscous liquid to plastic or brittle solid in an efficient and rapid manner and, importantly, from which the original hydrocarbon can be readily recovered.

Thus, according to the present invention, there is provided a method for the reversible transformation of a hydrocarbon or derivative thereof said method comprising:

(a) contacting said hydrocarbon or derivative thereof with a first reagent; and (b) subsequently contacting the resultant mixture with at least one second reagent;

such that substantially all of said hydrocarbon or derivative and said first and said second reagents are converted to a homogenous product of a pre-defined elasticity which can be controlled by the choice of said first and second reagents.

Although the hydrocarbons used in the present invention are usually liquid, this is not considered to be a requisite for the success of the invention. The hydrocarbon may be a solid, liquid or a gas dissolved or trapped in a suitable medium. The hydrocarbon may be soluble or insoluble in water, although it is conceded that best results are obtained for hydrocarbons which are insoluble in water. Preferred hydrocarbons include ethers; petroleum based liquids including kerosene, petroleum, crude oil; aromatic compounds, for example, toluene; ketones such as metyl isobutyl ketone; natural and refined animal, mineral and vegetable oils, for example, sunflower oil.

Preferably, said first reagent is an organic or inorganic acid, salt or base which is insoluble in water but soluble in said hydrocarbon or derivative thereof.

More preferably, said organic acid is a fatty acid, for example, selected from the group comprising stearic, oleic, palmitic and levulinic acids and similar.

The preferred choice for said second reagent depends on the end product required; if a granular product is required, the preferred second reagent is an alkali; if a semi-elastic product is required, the preferred second reagent is a solution of an elastomer or a latex; if a more elastic product is required, the a solution of an elastomer or a latex is followed by the addition of an aqueous acetate solution.

The more preferred said second reagent includes—as the alkali—ammonia, sodium hydroxide, sodium carbonate or bicarbonate or organic alkaline reagents;—as the Latex—the commercially available product of the same name comprising about 60% Latex in an aqueous base at a pH of approximately 10;—as the acetate—any organic or metal acetate, suitable examples including ammonium acetate and zinc acetate.

It will be well known that hydrocarbon-based products form a large part of today's commercial world and it is envisaged that the present invention will be useful in a number of areas. In particular, but not limited to, the range of purposes for which the present invention could be useful include:

(a) The manufacture of a range of solid or viscous liquid compounds which are of use in the production of various plastic materials which are now used in the manufacture of a multitude of items in common use today.

(b) The production of a suitable, convenient, and safe method for the storage and/or transport of volatile, unstable, environmentally sensitive or toxic hydrocarbons.

(c) A means for the effective "mopping up" of liquid hydrocarbon compounds.

(d) A means of sealing leaking or damaged containers of liquid hydrocarbon compounds.

(e) A means of converting volatile liquid hydrocarbons to less volatile and thus more manageable compounds.

One application of this embodiment is the preparation of a solid fuel.

In this embodiment, it should be possible to control the direct release of gaseous hydrocarbon thus eliminating, for example, the traditional carburettor necessary to vaporise conventional liquid hydrocarbon fuel.

(f) A method of increasing the viscosity of a range of liquid hydrocarbons.

(g) A method of converting liquid hydrocarbons to brittle solids and, if required, converting the brittle solids to less brittle and/or plastic or elastic compounds.

(h) A method to facilitate the salvage of liquid petroleum or other liquid hydrocarbons spilled or accidentally discharged over land or water, thus greatly reducing the environment impact and damage caused by such a spillage.

Preferably, in this embodiment of the invention, the hydrocarbon is modified to produce an elastic compound which can be readily retrieved from a body of water by any number of suitable methods. These methods include towing, pushing or skimming the elastic material from the surface of the water or by using spiked rollers connected between two vessels which, on rotation, can roll up the elastic material.

A modification to this embodiment is to treat only the perimeter of an oil spill to produce a containment barrier for the remaining, untreated hydrocarbon, thus eliminating the need for artificial booms, barriers and the like.

(i) A system to be carried on vessels or housed on site to prevent serious oil or similar spillage or leaks and to be used in the neutralising and clean-up or salvage of such leaks or spills.

(j) A method of entraining air or other gases into a matrix to form a foam.

(k) A method of quelling oil-well fires and the like.

In this embodiment, the first reagent is injected into the burning well at a suitable location beneath the flame front and the second reagent then injected a few meters above the first reagent but still below the flame front. By suitable selection of first and second reagents, the resultant homogenous product can be of candle-like consistency which burns at a much lower temperature than the un-treated oil and which is thus much easier to extinguish. Fire retardant could also be used as an additive to further assist in the quelling of the fire. The retardant could be added simultaneously with the first and/or second reagent, or it could be by separate addition following the first reagent.

Thus, according to another aspect of the present invention, there is provided a method of end product formation, said method comprising:

(a) reversibly transforming a hydrocarbon or derivative thereof by the method as defined above; and (b) further modifying the resultant product to produce said end product.

In this aspect, further modifying could include the addition of a range of suitable materials to produce bonding, framework, buoyancy, or fire retardant media. These additional materials may include, but are not restricted to, coal powder, clays, sand, fire retardants, natural and artificial fibers, hardening and softening agents, fillers, colouring, strengthening and preserving agents.

Although not wishing to be limited, it appears as if the success of the present invention is due to the production of a voluminous finely divided absorbent precipitate after the introduction of the second reagent, the absorbent then readily absorbing the hydrocarbon. Best results are obtained when water is present in significant excess which may explain the particular suitability of the present invention to the recovery of hydrocarbons from an oil spill on water.

DETAILED DESCRIPTION OF THE EMBODIMENTS

Preferred embodiments of the present invention will now be given with reference to the following examples.

EXAMPLE 1

Commercial Latex dispersion (60% Latex) (2 g) was mixed with ammonium acetate (1 g) in water (10 g) and added to a solution of stearic aid (1 g) in crude oil (10 g) at ambient temperature. After a few seconds, a coherent product was produced which subsequently transformed to an elastic solid.

EXAMPLE 2

Commercial Latex dispersion (60% Latex) (2 g) was mixed with zinc acetate (1 g) in water (10 g) and added to a solution of palmitic acid (1 g) in petroleum benzin (10 g) at ambient temperature. After a few seconds, an elastic product was produced.

EXAMPLE 3

Stearic acid (2 g) was mixed with petroleum benzin (20 g). Sodium hydroxide was added sufficient to neutralise the mixture whereupon a paste rapidly formed containing all of the benzin. On standing, the benzin volatilised leaving a small quantity of dry stearate powder.

EXAMPLE 4

Example 3 was repeated but with sodium hydroxide replaced by either ammonium hydroxide or sodium bicarbonate.

EXAMPLE 5

Commercial Latex dispersion (60% Latex) (2 g) was mixed with ammonium acetate (1 g) in water (10 g) and added to a solution of stearic acid (1 g) in petroleum benzin (10 g) at ambient temperature. After a few seconds, a coherent product was produced which subsequently transformed to an elastic solid. On standing over a long period, the benzin evaporated.

EXAMPLE 6

Commercial Latex dispersion (60% Latex) (2 g) was mixed with zinc acetate (1 g) in water (10 g) and added to a solution of palmitic acid (1 g) in crude oil (10 g) at ambient temperature. After a few seconds, an elastic product was produced.

EXAMPLE 7

Stearic acid (2 g) was mixed with crude oil (20 g). Sodium hydroxide was added sufficient to neutralise the mixture whereupon the crude oil rapidly solidified into a paste.

EXAMPLR 8

Commercial Latex dispersion (60% Latex) (2 g) was mixed with zinc acetate (1 g) in water (10 g) and added to a solution of palmitic acid (1 g) in sunflower oil (10 g) at ambient temperature. After a few seconds, an elastic product was produced which was readily handled.

EXAMPLE 9

Commercial Latex dispersion (60% Latex) (2 g) was mixed with zinc acetate (1 g) in water (10 g) and added to a solution of palmitic acid (1 g) in ether (10 g) at ambient temperature. After a few seconds, an elastic product was produced.

EXAMPLE 10

Commercial Latex dispersion (60% Latex) (2 g) was mixed with zinc acetate (1 g) in water (10 g) and added to a solution of stearic acid (1 g) in kerosene (10 g) at ambient temperature. After a few seconds, an elastic product was produced.

EXAMPLE 11

Commercial Latex dispersion (60% Latex) (2 g) was mixed with zinc acetate (1 g) in water (10 g) and added to a solution of palmitic acid (1 g) in toluene (10 g) at ambient temperature. After a few seconds, an elastic product was produced.

EXAMPLE 12

Commercial Latex dispersion (60% Latex) (2 g) was mixed with zinc acetate (1 g) in water (10 g) and added to a solution of palmitic acid (1 g) in MIBK (10 g) at ambient temperature. After a few seconds, an elastic product was produced.

EXAMPLE 13

Commercial Latex dispersion (60% Latex) (2 g) was mixed with magnesium acetate (1 g) in water (10 g) and added to a solution of stearic acid (1 g) in petroleum benzin (10 g) at ambient temperature. After a few seconds, an elastic product was produced.

EXAMPLE 14

Commercial Latex dispersion (60% Latex) (2 g) was mixed with sodium acetate (1 g) in water (10 g) and added to a solution of oleic acid (1 g) in petroleum benzin (10 g) at ambient temperature. After a few seconds, an elastic product was produced.

EXAMPLE 15

Commercial Latex dispersion (60% Latex) (2 g) was mixed with ammonium acetate (1 g) in water (10 g) and added to a solution of palmitic acid (1 g) in petroleum benzin (10 g) at ambient temperature. After a few seconds, an elastic product was produced.

EXAMPLE 16

Commercial Latex dispersion (60% Latex) (2 g) was mixed with ammonium acetate (1 g) in water (10 g) and added to a solution of stearic acid (1 g) in crude oil (10 g) at ambient temperature. After a few seconds, a coherent product was produced which subsequently transformed to an elastic solid.

EXAMPLE 17

Commercial Latex dispersion (60% Latex) (2 g) was mixed with ammonium acetate (1 g) in water (10 g) and added to a solution of oleic acid (1 g) in crude oil (10 g) at ambient temperature. After a few seconds, a coherent product was produced which subsequently transformed to an elastic solid.

EXAMPLE 18

Commercial Latex dispersion (60% Latex) (2 g) was mixed with zinc acetate (1 g) in water (10 g) and added to a solution of oleic acid (1 g) in sunflower oil (10 g) at ambient temperature. After a few seconds, an elastic product was produced.

EXAMPLE 19

Oleic acid (2 g) was mixed with petroleum benzin (20 g). Sodium hydroxide was added sufficient to neutralise the mixture whereupon the benzin rapidly solidified into a paste.

EXAMPLE 20

Stearic acid (2 g) was mixed with petroleum benzin (20 g). Sodium hydroxide was added sufficient to neutralise the mixture whereupon the benzin rapidly solidified into a paste.

EXAMPLE 21

Commercial Latex dispersion (60% Latex) (2 g) was mixed with zinc acetate (1 g) in water (10 g) and added to a solution of palmitic acid (1 g) in petroleum benzin (10 g) at ambient temperature. After a few seconds, an elastic product was produced.

EXAMPLE 22

Commercial Latex dispersion (60% Latex) (2 g) was mixed with ammonium acetate (1 g) and "GUARD" fire extinguisher powder (2 g) in water (10 g) and added to a solution of stearic acid (1 g) in crude oil (10 g) at ambient temperature. After a few seconds, an elastic product was formed. The elastic product melted without igniting upon the application of a gas flee.

In all of the above examples, the original hydrocarbons can readily be recovered by simple evaporation, distillation or re-dissolution of the homogenous product.

In Examples 1 to 21, the homogenous product burnt with a candle-like flame upon the application of a gas flame. This candle-like flame could be readily extinguished.

The present invention should be suitable for the rapid conversion of a wide range of organic compounds into solid or plasticine-like material. The product of reaction will not flow and can be stacked, shovelled, and handled like a solid. The product, however, can be easily treated to allow the original liquid to be recovered in its original condition.

The invention appears to have significant applications in the safe transport and storage of dangerous liquids. The solid medium reduces the chances of cargo shift, leakage and serious spills from ruptured containers. If such spillages occur then the solid products can be more readily removed and the valuable liquids salvaged. Inflammable and toxic liquids spills may be prevented from escaping into the environment, leaking into the ground water system, or dispersing across lakes, ponds, the sea or other water surfaces.

The rapid conversion of water insoluble or immiscible organic reagents into a light weight solid form allows for the application of the invention to the clean-up of liquid hydrocarbon spillages, particularly of crude oil and petroleum products on land or water. The chemical reagents may be sprayed from the air or ship onto the hydrocarbon spill surface, allowed to set over a matter of minutes and then once solidified the floating solid mass can be towed, pushed, skimmed or rolled up from the water or land surface for disposal.

It will be appreciated that the above examples have been given merely to illustrate the present invention and that modifications and alterations may be made without departing from the inventive concept as defined in the following claims.

I claim:

1. A method for the reversible transformation of a hydrocarbon or derivative thereof, said method comprising:
   (a) contacting said hydrocarbon or derivative thereof with a first reagent, said first reagent comprising an organic or inorganic acid, salt or base; and
   (b) subsequently contacting the resultant mixture with at least one second reagent, said second reagent comprising an alkali, a solution of elastomer or a latex;
   wherein substantially all of said hydrocarbon or derivative and said first and second reagents are converted to a homogenous product of a pre-defined elasticity which can be controlled by the choice of said first and second reagents.

2. A method as defined in claim 1 wherein after said contacting with at least one second reagent, a precipitate is formed which absorbs said hydrocarbon or derivative thereof to form said homogenous product.

3. A method as defined in claim 1, wherein said hydrocarbon or derivative thereof is in association with a significant excess quantity of water.

4. A method as defined in claim 1 wherein said first reagent is an organic acid which is insoluble in water but soluble in said hydrocarbon or derivative thereof.

5. A method as defined in claim 4, wherein said organic acid is a fatty acid.

6. A method as defined in claim 5, wherein said fatty acid is selected from the group consisting of stearic, oleic, palmitic and levulinic acid.

7. A method as defined in claim 1 wherein said second reagent is selected from an alkali or a latex.

8. A method as defined in claim 7 wherein said latex also includes an organic or metal acetate.

9. A method as defined in claim 8 wherein said acetate is selected from the group consisting of zinc acetate, magnesium acetate, and sodium acetate.

10. A method as defined in claim 8 wherein said acetate is ammonium acetate.

11. A method as defined in claim 7 wherein said alkali is selected from the group consisting of sodium hydroxide, sodium carbonate, sodium bicarbonate, ammonia, ammonium hydroxide and organic alkaline reagents.

12. A method of end product formation, said method comprising:
    (a) reversibly transforming a hydrocarbon or derivative thereof by the method as defined in claim 20; and
    (b) further modifying the resultant product to produce said end product.

13. A method as defined in claim 12, wherein said further modifying includes adding at least one material selected from the group consisting of coal powder, clays, sand, fire retardants, natural and artificial fibers, hardening and softening agents, fillers, coloring agents and strengthening agents and preserving agents.

14. A method of sealing a leaking or damaged container of a liquid hydrocarbon, said method comprising reversibly transforming said hydrocarbon by the method as defined in claim 1 wherein said homogenous product is non-flowing.

15. A method of salvaging a liquid hydrocarbon from a body of water, said method comprising:
    (a) reversibly transforming said hydrocarbon by the method as defined in claim 1 wherein said homogenous product is elastic; and
    (b) retrieving said homogenous product from said body of water.

16. A method of quelling an oil-well fire, said method comprising reversibly transforming the hydrocarbons burning in said oil-well by the method as defined in claim 1 wherein said first reagent is injected into said oil-well at a suitable location beneath the flame front and wherein said second reagent is injected above said first reagent but before said flame front to produce said homogenous product.

17. A method as defined in claim 16 wherein a fire retardant is added simultaneously with said first reagent and/or said second reagent, or wherein a fire retardant is added by separate addition after said first reagent.

18. A homogenous product prepared by a method as defined in claim 1.

19. A homogenous product as defined in claim 18 which is a solid fuel.

* * * * *